United States Patent
Makita et al.

(10) Patent No.: US 10,685,565 B2
(45) Date of Patent: Jun. 16, 2020

(54) SERVER, VEHICLE, AND SYSTEM

(71) Applicant: Toyota Jidosha Kabushiki Kaisha, Toyota-shi, Aichi-ken (JP)

(72) Inventors: Mitsugu Makita, Nagoya (JP); Daigo Fujii, Tsushima (JP); Naoki Yamamuro, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/266,204

(22) Filed: Feb. 4, 2019

(65) Prior Publication Data
US 2019/0244522 A1 Aug. 8, 2019

(30) Foreign Application Priority Data

Feb. 5, 2018 (JP) .................. 2018-018491

(51) Int. Cl.
*G08G 1/123* (2006.01)
*H04W 4/024* (2018.01)
*G08G 1/00* (2006.01)

(52) U.S. Cl.
CPC ............. *G08G 1/123* (2013.01); *G08G 1/202* (2013.01); *H04W 4/024* (2018.02)

(58) Field of Classification Search
CPC .......... G08G 1/00; G08G 1/005; G08G 1/123; G08G 1/127; G08G 1/13; G08G 1/133; G08G 1/202; H04W 4/024; H04W 4/40
See application file for complete search history.

(56) References Cited

U.S. PATENT DOCUMENTS

| | | | | |
|---|---|---|---|---|
| 8,738,292 B1* | 5/2014 | Faaborg | ................. | G01C 21/26 701/537 |
| 2006/0167616 A1* | 7/2006 | Yamane | ............. | G01C 21/3492 701/117 |
| 2016/0078692 A1* | 3/2016 | Tutte | ...................... | G06Q 50/01 701/29.1 |
| 2018/0137595 A1* | 5/2018 | Kim | ....................... | B60Q 9/008 |
| 2018/0211352 A1* | 7/2018 | Lim | ....................... | G06Q 50/30 |
| 2019/0206009 A1* | 7/2019 | Gibson | ................. | G06N 7/005 |

FOREIGN PATENT DOCUMENTS

JP 2014214975 A 11/2014

* cited by examiner

*Primary Examiner* — Van T Trieu

(74) *Attorney, Agent, or Firm* — Dinsmore & Shohl LLP

(57) ABSTRACT

A server is used to provide a smoking vehicle to a user who wants to smoke. The server includes a communication device. The communication device is configured to receive first time information indicating a boarding time and first location information indicating a boarding location from an information terminal of the user. The communication device is configured to receive location information of the vehicle. The communication device is configured to transmit the first time information and the first location information to the vehicle.

9 Claims, 6 Drawing Sheets

FIG. 4

| VEHICLE ID | LATITUDE | LONGITUDE | OPERATING STATUS | RUNNING STATUS | ROUTE INFORMATION |
|---|---|---|---|---|---|
| A | Xa | Ya | ... | RUNNING | ... |
| B | Xb | Yb | ... | PARKED | ... |
| C | Xc | Yc | ... | RUNNING | ... |
| D | Xd | Yd | ... | RUNNING | ... |
| E | Xe | Ye | ... | PARKED | ... |
| ... | ... | ... | ... | ... | ... |
| ... | ... | ... | ... | ... | ... |

SERVER, VEHICLE, AND SYSTEM

CROSS-REFERENCE TO RELATED APPLICATIONS

This application claims priority to Japanese Patent Application No. 2018-018491 filed on Feb. 5, 2018, which is incorporated herein by reference in its entirety including the specification, drawings and abstract.

BACKGROUND

1. Technical Field

The disclosure relates to a server, a vehicle, and a system.

2. Description of Related Art

It is not easy to provide an environment that suits the preferences of various users.

Japanese Unexamined Patent Application Publication No. 2014-214975 (JP 2014-214975 A) describes a technique for, as a user makes a request, such as "hot", in an object space, extracting an environment condition of the preference of the user who made the request based on the ID of the user and then transmitting a recommended location that satisfies the preference of the user to a user terminal.

SUMMARY

However, JP 2014-214975 A does not refer to a technique for providing optimum smoking environments to smokers.

Although smokers are allowed to smoke in smoking spaces equipped with a smoke removal system, or the like, it is not easy for smokers to find smoking environments, such as smoking spaces, away from home. In addition, smokers are required to move to smoking spaces and back.

The disclosure provides a server, vehicle, and system that are able to easily provide a smoking environment to a smoker when the smoker desires.

A first aspect of the disclosure relates to a server. The server is used to provide a smoking vehicle to a user who wants to smoke. The server includes a communication device. The communication device is configured to receive first time information indicating a boarding time and first location information indicating a boarding location from an information terminal of the user. The communication device is configured to receive location information of the vehicle. The communication device is configured to transmit the first time information and the first location information to the vehicle.

With the above configuration, since the communication device receives the first time information indicating the boarding time and the first location information indicating the boarding location from the information terminal of the user who wants to smoke, and transmits the first time information and the first location information to the smoking vehicle, it is possible to easily get a smoking place. Since it is not required to look all the way for a smoking space and move to the smoking space, the user is allowed to smoke efficiently.

In the server, the communication device may be configured to further receive second time information indicating an alighting time and second location information indicating an alighting location from the information terminal of the user, and the communication device may be configured to transmit the second time information and the second location information to the vehicle.

Location information, such as the first location information, may be information that indicates a predetermined area. Information that indicates that a predetermined location has been selected by the user from among a plurality of location candidates may be received as location information, such as the first location information. The second location information may be information that is the same as the first location information. A current location of the user may be automatically set for the first location information or the second location information.

The first time information and the second time information each may be information that indicates a predetermined time period. Information that indicates that a predetermined time period has been selected by the user from among a plurality of time periods may be received as the first time information or the second time information. For example, when a nearest vehicle is not able to reach the location indicated by the first location information at the time indicated by the first time information, the user may be caused to select a predetermined time period from among time periods during which the vehicle is able to reach the location, and information that indicates that the predetermined time period has been selected by the user may be received as the first time information or the second time information. The second time information may be time information with reference to the first time information, or the like. The second time information is, for example, information that indicates a time that is predetermined time after the time indicated by the first time information. A current time or an earliest time at which the vehicle is able to reach the location (including the current location) indicated by the first location information or the second location information may be automatically set for the first time information.

In the server according to the first aspect may further include a processor. The communication device may be configured to receive location information from a plurality of the vehicles. The processor may be configured to select one of the plurality of vehicles based on the received first time information, the received second time information, the received first location information, the received second location information, and the location information received from each of the plurality of vehicles; and the communication device may be configured to transmit the first time information, the first location information, the second time information, and the second location information to the selected vehicle.

In the server according to the above aspect, the second location information may be the same as the first location information.

In the server according to the first aspect may further include a processor. The communication device may be configured to receive, from the vehicle, route information indicating a stopover place where the vehicle is scheduled to move and a time at which the vehicle reaches the stopover place; and the processor may be configured to determine whether the vehicle is able to move to the location indicated by the first location information at the time indicated by the first time information based on the route information.

In the server according to the above aspect, the first location information may be information that indicates a current location of the user.

A second aspect of the disclosure relates to a smoking vehicle. The vehicle includes a communication device and a processor. The communication device is configured to transmit location information of the vehicle to a server. The communication device is configured to receive first time information indicating a boarding time and first location information indicating a boarding location from a server that receives the first time information and the first location information from an information terminal of a user who wants to smoke. The processor is configured to calculate a route to reach the location indicated by the first location information at the time indicated by the first time information.

With the above configuration, since the vehicle moves based on the first time information indicating the boarding time and the first location information indicating the boarding location, received from the server that receives the first time information and the first location information from the information terminal of the user who wants to smoke, the user is able to easily get a smoking place. Since it is not required to look all the way for a smoking space and move to the smoking space, the user is allowed to smoke efficiently.

In the vehicle according to the second aspect, the communication device may be configured to receive second time information indicating an alighting time and second location information indicating an alighting location from the server that receives the second time information and the second location information from the information terminal of the user; and the processor may be configured to calculate a route to reach the location indicated by the second location information at the time indicated by the second time information.

In the vehicle according to the above aspect, the processor may be configured to, when the processor has received third time information indicating a boarding time and third location information indicating a boarding location from the server that receives the third time information and the third location information from an information terminal of a second user who wants to smoke, calculate a route to reach the location indicated by the first location information at the time indicated by the first time information, to reach the location indicated by the second location information at the time indicated by the second time information, and to reach the location indicated by the third location information at the time indicated by the third time information.

In the vehicle according to the above aspect, may further include an output device configured to display the route.

A third aspect of the disclosure relates to a system. The system includes a plurality of smoking vehicles to be provided to a user who wants to smoke, and a server. The server is configured to carry out communication with the plurality of vehicles. The server is configured to receive first time information indicating a boarding time and first location information indicating a boarding location from an information terminal of the user. The server is configured to receive location information from each of the plurality of vehicles. The server is configured to transmit the first time information and the first location information to the vehicle selected from among the plurality of vehicles.

With the above configuration, since the system includes the server that receives the first time information indicating the boarding time and the first location information indicating the boarding location from the information terminal of the user who wants to smoke, it is possible to move the vehicle to the specified place at the specified time based on the first time information and the first location information. Therefore, the user is able to easily get a smoking place. Since it is not required to look all the way for a smoking space and move to the smoking space, the user is allowed to smoke efficiently.

According to the aspects of the disclosure, it is possible to provide a server, vehicle, and system that, when a smoker wants, easily gets a smoking place and allows the smoker to smoke efficiently.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an example of vehicle status information that is recorded in a status information storage unit;

DETAILED DESCRIPTION OF EMBODIMENTS

Figure 1:
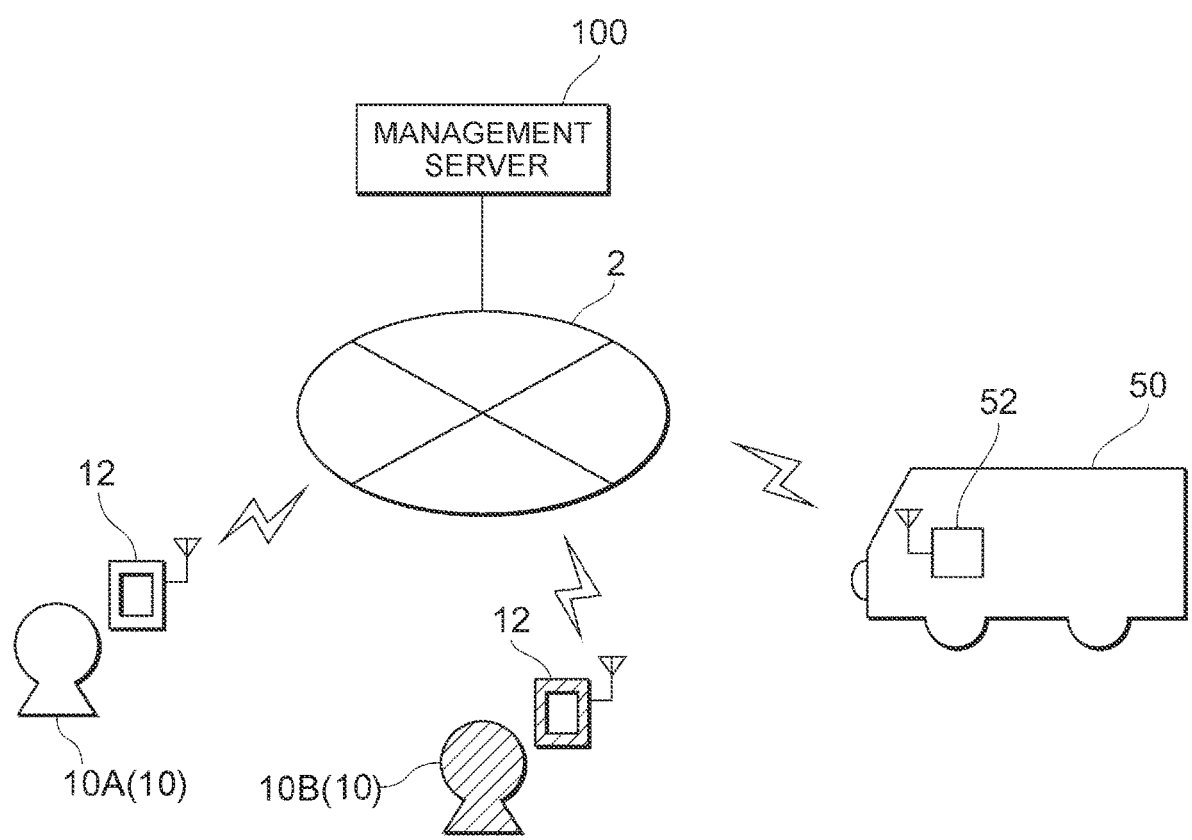
FIG. 1 is the configuration of a system for providing vehicle dispatch service according to a first embodiment.

Hereinafter, an embodiment of the disclosure will be described in detail with reference to the accompanying drawings. Like reference numerals denote components having the same or similar functions, and the description thereof is omitted or simplified.

The following embodiment is only illustrative for describing one example of the disclosure, so the disclosure should not be interpreted restrictively to the following description. The disclosure may be implemented by modifying the following description within the scope of exercise of ordinary creativity of a person skilled in the art. The disclosure may be implemented by a rational combination of a matter described in one alternative embodiment with a matter described in another alternative embodiment.

First Embodiment

FIG. 1 shows the configuration of a system 1 for providing smoking vehicle dispatch service (hereinafter, simply referred to as vehicle dispatch service) according to the present embodiment.

The system 1 includes a plurality of user terminals 12 (each of which is an example of an information terminal of a user), a plurality of vehicles 50, and a management server 100 (which is an example of a server). The user terminals 12 are respectively held by users 10. The vehicles 50 are used to provide the service. The management server 100 is used to manage and operate the smoking vehicle dispatch service by accepting dispatch service requests from the users 10 and dispatching optimum vehicles 50. The management server 100 does not need to be formed of a single server. For example, in order to improve latency and reduce communication traffic, an edge server may be provided at a short distance from the users 10 in addition to a cloud server, and the edge server may be configured to process highly regional information.

The users 10 (simply referred to as users 10 when collectively referred, and referred to as user 10A, user 10B, and the like, when users are distinguished from each other) are any members who have subscribed to the vehicle dispatch service that is provided by a business operator that manages the management server 100 and the vehicles 50.

Figure 2:
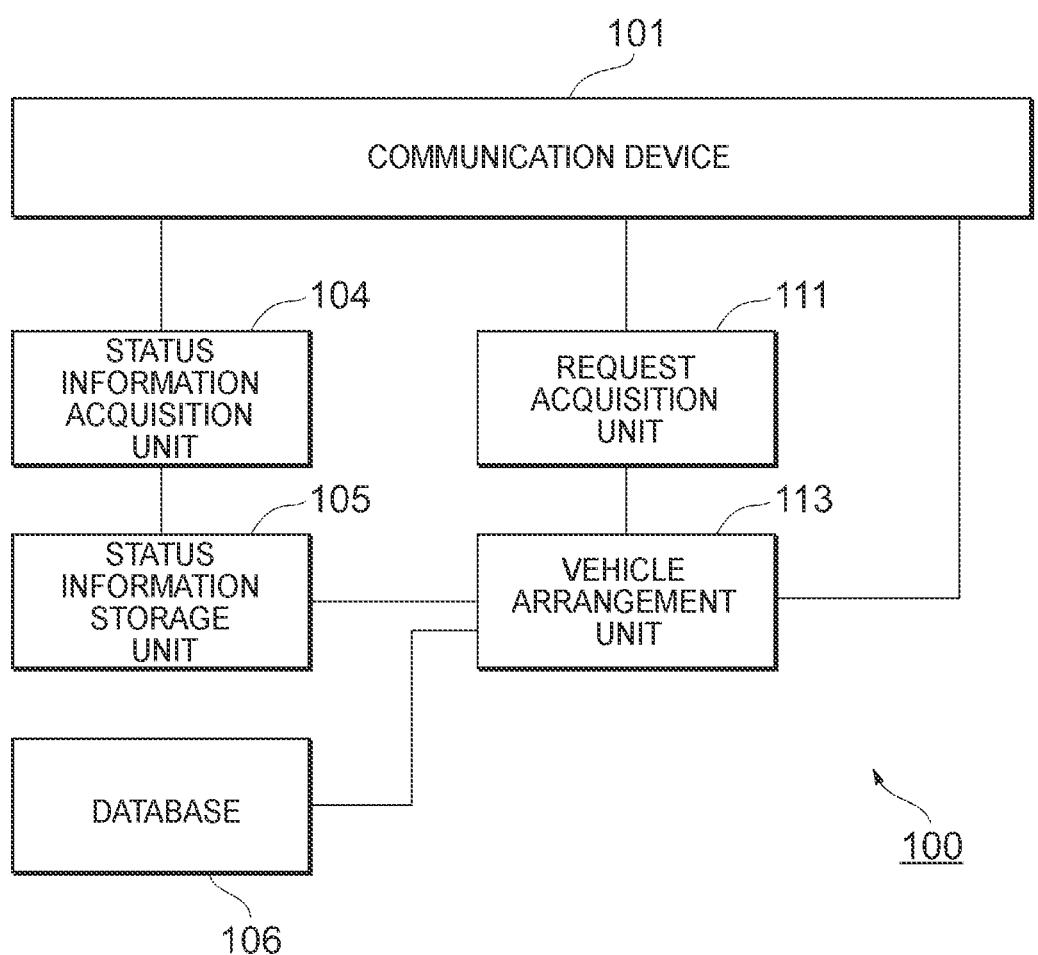
FIG. 2 is the functional block diagram of a management server.

FIG. 2 shows the functional blocks of the management server 100. The management server 100 manages information about the plurality of users 10 and the plurality of vehicles 50. The management server 100 arranges an appropriate one of the vehicles 50 based on a request from any one of the users 10. The management server 100 includes a communication device 101, a status information acquisition unit 104, a status information storage unit 105, a database 106, a request acquisition unit 111, and a vehicle arrangement unit 113.

The above functions of the management server 100 are implemented by a processor for operational processes, a temporary storage device, a nonvolatile storage medium on which programs, and the like, are recorded, a communication interface, an input device, an output device, and the like. The processor is an application specific integrated circuit for reading and executing the programs stored in the storage medium (including programs that define operational processes for selecting a predetermined one of the vehicles 50 to be arranged and other operational processes in this disclosure). The temporary storage device is formed of a static random access memory (SRAM), or the like. The temporary storage device temporarily stores part of the programs, operation data, and the like. The storage medium is a nonvolatile storage medium that stores the programs that define operational processes in this disclosure and data, such as a map, in an electric, magnetic, optical, mechanical, or chemical manner, or in a combination manner of any two or more of them in a computer-readable state. Examples of the storage medium include a magnetic disk and a semiconductor memory (such as a NAND flash memory). The communication interface is, for example, a wired or wireless communication interface circuit for exchanging information with an external device. The management server 100 may include an input device and an output device. The input device is a device for inputting information. Examples of the input device include a mouse, a keyboard, a touch pad, a keypad, and a microphone. The output device is a device for outputting information. Examples of the output device include a display and a speaker.

The communication device 101 includes a communication interface circuit. The communication interface circuit connects to a network 2, and operates in accordance with at least one communication interface standard that enables transmission and reception of information, required to provide the vehicle dispatch service, between the user terminal 12 of at least one user 10 who has made a request for the service and a plurality of vehicle terminals 52. The communication device 101 receives, from the user terminal 12, a request for the vehicle dispatch service, or the like, from the user 10, and transmits response information, or the like, in response to the request. The communication device 101 receives, from the vehicle terminals 52, pieces of vehicle status information (FIG. 4) that indicate the location information of the vehicles 50, the route information of the vehicles 50, and the like, and transmits instruction information for dispatching a predetermined one of the vehicles 50 to the user 10.

The status information acquisition unit 104 extracts and acquires the location information of the user 10. The location information of the user 10 has been received from the user terminal 12 by the communication device 101. The status information acquisition unit 104 extracts and acquires vehicle status information. The vehicle status information indicates the location information of the vehicles 50, the route information of the vehicles 50, and the operating statuses, such as use statuses, of the vehicles 50. The location information, the route information, and the operating statuses have been received from the vehicle terminals 52 by the communication device 101.

The status information storage unit 105 records and updates in real time status information regarding the users 10 and the vehicles 50 based on the information acquired by the status information acquisition unit 104. The vehicle status information will be described later.

The database 106 stores map information and authentication information, and the like, of members. The database 106 may further store surrounding road conditions received in real time from the communication device 101 in association with location information.

The request acquisition unit 111 accepts a request for the vehicle dispatch service from the user 10, a boarding location and a boarding time to get into the vehicle 50 for smoking, and an alighting location and an alighting time to get off the vehicle 50.

Figure 5:
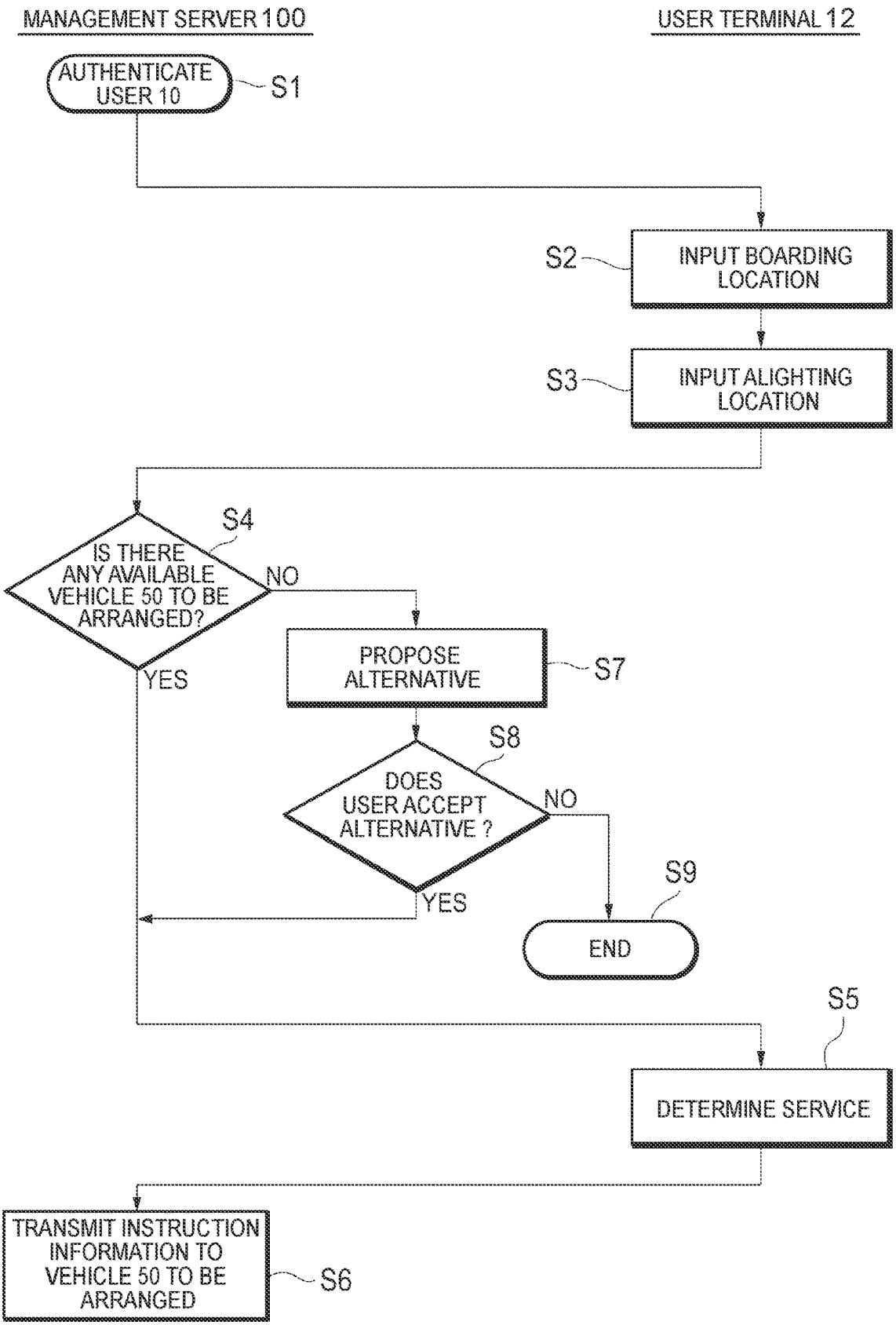
FIG. 5 is a flowchart that shows a vehicle dispatch process.

As the vehicle arrangement unit 113 accepts a request for the vehicle dispatch service from the user 10, the vehicle arrangement unit 113 executes an operational process for selecting a predetermined one of the vehicles 50 to be arranged for the user 10 by consulting the status information storage unit 105 and the database 106. The details of the operational process will be described later (FIG. 5). The vehicle arrangement unit 113 transmits instruction information to the selected vehicle 50 via the communication device 101 in order to dispatch the selected vehicle 50 to the user 10.

The user terminal 12 (FIG. 1) is a mobile information terminal, such as a smartphone and a tablet, that has installed application software (hereinafter, referred to as application). The application is provided from the business operator that operates the vehicle dispatch service. The user terminal 12, as well as the management server 100, includes a processor for operational processes, a temporary storage device, a nonvolatile storage medium on which programs, and the like, are recorded, a communication interface circuit, an input device, an output device, and the like.

By launching the application, the user 10 is allowed to cause the communication interface circuit of the user terminal 12 to function as a communication unit for exchanging information with the management server 100 via the network 2. In addition, by launching the application, the user 10 is allowed to cause an input/output device to function as an input unit for inputting a boarding time, a boarding location, an alighting time, and an alighting location and an output unit for displaying information received from the management server 100. The input/output device is, for example, a touch panel display that displays text and images and that receives user's input through pressing.

Each vehicle 50 (FIG. 1) is a large-sized automobile that is driven by a staff, and is, for example, a vehicle that has a riding capacity of approximately 10 persons with a smoking space inside. Alternatively, each vehicle 50 may be formed of a large-sized vehicle that includes a plurality of coupled vehicles and that travels along a predetermined route.

Each vehicle 50 is provided with a plurality of single seats and a plurality of multiple seats that allow people to smoke comfortably inside. A private space that allows people to have a meeting may be provided inside. Each vehicle 50 may further include equipment for offering beverages and snacks or a facility for having a sleep, or may have a vending machine for cigarettes, or the like, installed therein.

A clean room is provided between the smoking space and entrance of each vehicle 50 in order to remove toxic substances adherent to the clothing, and the like, of the user 10. The adherent toxic substances are removed by directly spraying air jet cleaned by a filter from the clean room to the user 10 who gets off. Thus, it is possible to remove the adherent toxic substances.

In addition, an air cleaner is provided in the smoking space of each vehicle 50 in order to aspirate sidestream smoke and used smoke. An air curtain device is provided at the entrance of each vehicle 50 in order to flow a layer of fresh air called air curtain to the boundary between the vehicle 50 and the outside. Spraying of these air jet and air curtain may be controlled so as to be activated only when the user 10 gets in or gets off. Spraying of these air jet and air curtain may be, for example, configured to be activated in interlock with a door to enter the clean room from the smoking space and the entrance of the vehicle 50.

Each vehicle 50 does not need to include the same equipment. For example, a predetermined one of the vehicles 50 may be the one for the user 10 to enjoy drinking alcohol, or the like, while smoking. The user 10 may be allowed to make a vehicle dispatch request with the specified vehicle 50 including predetermined equipment. An unattended self-guided vehicle equipped with artificial intelligence may be used as each vehicle 50.

Each vehicle 50 includes the vehicle terminal 52 for carrying out communication with the management server 100.

Figure 3:
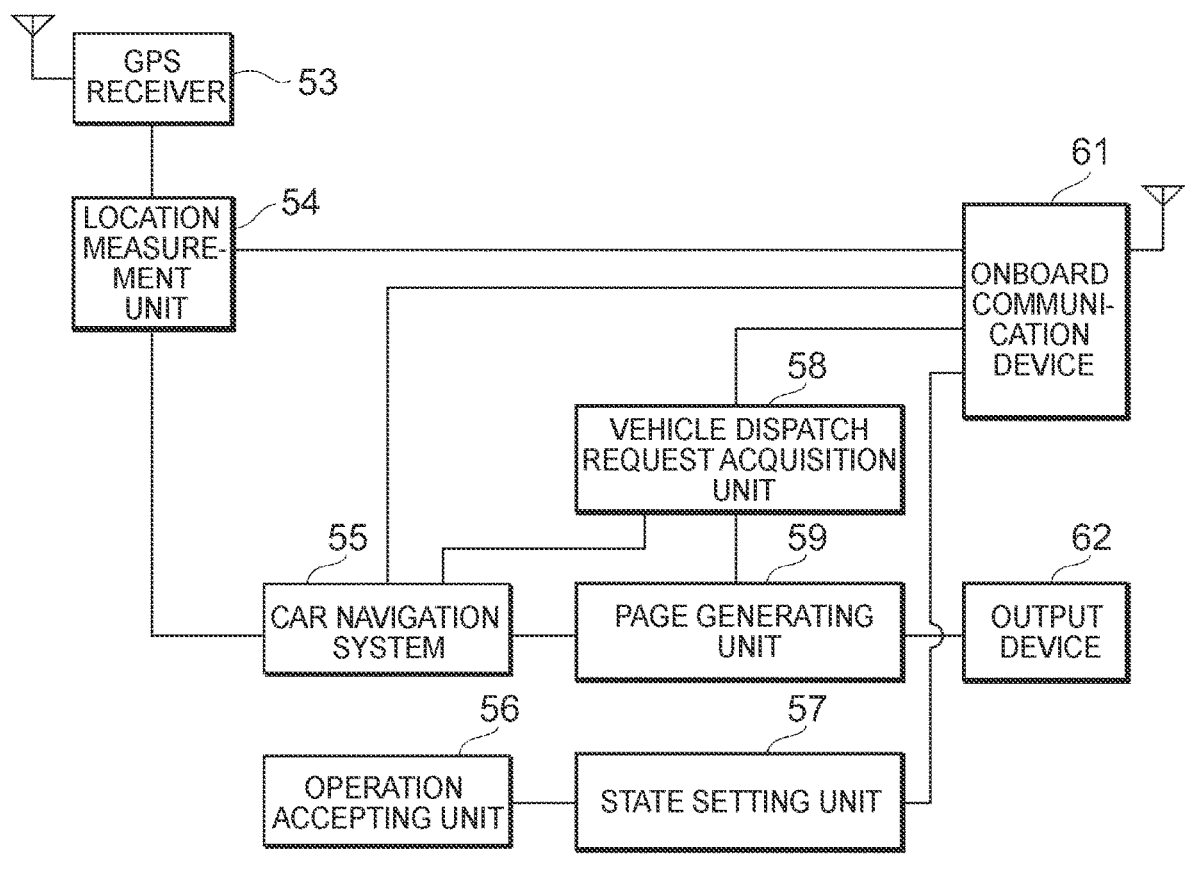
FIG. 3 is the functional block diagram of a vehicle terminal.

FIG. 3 is the functional block diagram of the vehicle terminal 52. The vehicle terminal 52 includes a GPS receiver 53, a location measurement unit 54, a car navigation system 55, an operation accepting unit 56, a state setting unit 57, a vehicle dispatch request acquisition unit 58, a page generating unit 59, an onboard communication device 61, and an output device 62. The output device 62 includes a display.

Since the vehicle terminal 52 has a similar hardware configuration to that of the management server 100, the description thereof is omitted. The vehicle terminal 52 includes a nonvolatile storage medium, programs recorded on the nonvolatile storage medium (including programs that define operational processes that are executed by the vehicle terminal 52 in this disclosure), and a processor that is typically an application specific integrated circuit (ASIC) for executing predetermined operational processes in accordance with the programs.

The onboard communication device 61 includes an interface circuit that connects to the network 2 via a wireless base station or a wireless access point through wireless communication and that transmits or receives information required for the service to or from the communication device 101 of the management server 100. The GPS receiver 53 receives, via a GPS antenna, GPS signals that a plurality of GPS satellites transmits. The location measurement unit 54 measures the current location of the vehicle terminal 52 based on the received GPS signals. Specifically, the location measurement unit 54 determines the latitude and longitude of the vehicle terminal 52 by calculation, and acquires the latitude and the longitude as the current location information of the vehicle 50 and vehicle terminal 52. The location measurement unit 54 periodically acquires the location information and supplies the location information to the onboard communication device 61. The onboard communication device 61 periodically transmits the acquired location information to the management server 100 as the current location information of the vehicle 50. The location measurement unit 54 also supplies the acquired location information to the car navigation system 55. Even when the ignition switch of the vehicle 50 is turned off, it is desirable that the functions of the GPS receiver 53, location measurement unit 54, and onboard communication device 61 be kept active and the onboard communication device 61 periodically transmit the location information to the management server 100.

As the vehicle dispatch request acquisition unit 58 acquires instruction information that indicates a vehicle dispatch instruction from a vehicle arrangement unit 113 of the management server 100 via the onboard communication device 61, the vehicle dispatch request acquisition unit 58 supplies the received instruction information to the car navigation system 55 and the page generating unit 59. The instruction information includes at least identification information that identifies the user 10, and information that indicates a boarding location and boarding time at which the user 10 gets in and an alighting location and alighting time at which the user 10 gets off.

The page generating unit 59 generates a message page to inform a staff who drives the vehicle 50 that there is a vehicle dispatch request based on the instruction information received from the vehicle dispatch request acquisition unit 58, and displays the message page on a staff display in the output device 62 including the staff display and a user display.

Thus, the staff recognizes that the vehicle 50 needs to pick up a new user 10. Alternatively, the output device 62 may have a voice output function, and may provide a staff with the fact that there is a vehicle dispatch request by voice. When an unattended guided vehicle is used as each vehicle 50, no staff display, or the like, needs to be provided.

The car navigation system 55 acquires boarding location information of the user 10, included in the instruction information received from the vehicle dispatch request acquisition unit 58, in association with a boarding time as one of stopover places. The car navigation system 55 also acquires alighting location information in association with an alighting time as one of the stopover places. The car navigation system 55 acquires a new route that incorporates two newly received stopover places in time sequence into an already acquired route including the plurality of stopover places by calculation.

The page generating unit 59 causes the staff display to display a page for guiding a route to reach the stopover places at predetermined times. The page generating unit 59 also generates route information including the stopover places and the arrival times, and causes the staff display and the user display to display the route information. The user display is installed in a smoking room for the user 10 to watch.

Thus, the staff is able to drive the vehicle 50 to the next stopover place such that the vehicle 50 reaches the next stopover place at the predetermined time. The user 10 riding in the vehicle 50 is allowed to learn the route of the vehicle 50. When the user 10 wants the route information of the vehicle 50, the route information of the vehicle 50 is allowed to be transmitted to the user terminal 12 of the user 10 as well via the management server 100. Therefore, not only the user 10 in the vehicle 50 but also the user 10 before getting in the vehicle 50 is allowed to learn the current location of the vehicle 50 and a scheduled route in real time.

The staff display may display the name of the user 10 before getting in the vehicle 50 or while riding in the vehicle 50, and the boarding location, boarding time, alighting location, and alighting time of the user 10 based on the instruction information.

When the user 10 gets in or off the vehicle 50 or when the user 10 uses equipment in the vehicle 50 (for example, a meeting room, or a vending machine for, for example, purchasing items, such as cigarettes), the operation accepting unit 56 accepts the ID of the user 10 from a communication unit, such as short-distance wireless unit, of the user terminal 12. The state setting unit 57 transmits the ID of the user 10, received from the operation accepting unit 56, to the management server 100 via the onboard communication device 61. For this reason, the management server 100 recognizes the fact that the user 10 has actually got in the vehicle 50 or got off the vehicle 50 or the fact that the user 10 has purchased a predetermined item, or the like. The business operator is able to charge the user 10 based on this information.

FIG. 4 shows an example of the vehicle status information that is recorded on the status information storage unit 105 of the management server 100.

As shown in this table, the vehicle status information includes, for each vehicle 50, a vehicle ID that identifies the vehicle 50, and latitude and longitude information that indicates the current location of the vehicle 50. The vehicle status information further includes, as the operating status of the vehicle 50, the number of users 10 riding in the vehicle 50 to the capacity of the vehicle 50 and information that indicates whether special equipment (for example, a meeting room) is being used.

The vehicle status information further includes information regarding a running status that indicates whether the vehicle 50 is running or parked, and route information.

The route information is information in which, where a boarding location that is recorded in association with a boarding time and an alighting location that is recorded in association with an alighting time are set as stopover places, a plurality of stopover places is arranged in time sequence.

Hereinafter, a method of providing the vehicle dispatch service to dispatch smoking vehicles 50 with the use of the thus configured system 1 will be described. FIG. 5 is a flowchart that shows a main process of this method.

A staff is allocated by the management server 100 to a coverage area that the staff takes charge of. The staff waits for a vehicle dispatch request while driving the vehicle 50 along a predetermined traveling route within the coverage area. The staff may wait for a vehicle dispatch request while stopping the vehicle 50 in a predetermined location. The management server 100 receives vehicle status information including current location information acquired from GPS, the operating status of the equipment, and the like, from the vehicle terminal 52 of each vehicle 50, and updates the vehicle status information in real time.

As the user 10 launches the application of the user terminal 12 and inputs ID and password, the user terminal 12 transmits these ID and password to the management server 100 via the network 2 together with the current location information of the user 10.

As the management server 100 receives the ID and password of the user 10 from the user terminal 12, the management server 100 searches the database 106, and authenticates the user 10 (step S1). The management server 100 may transmit the running statuses of the smoking vehicles 50 running near the user 10 to the user terminal 12 via the network 2 based on the received current location information of the user 10 as a response to the user 10.

The user 10 inputs a boarding time (an example of first time information) at which the user 10 wants to get in the vehicle 50 with the use of the user terminal 12. Instead of inputting a specific time, the user terminal 12 may be configured to display a menu indicating that the user 10 wants to get in as early as possible (an example of first time information) on the user terminal 12, and accept input of the one selected by the user 10.

The user 10 further inputs a desired boarding location (an example of first location information) with the use of the user terminal 12 (step S2). For example, the user 10 is allowed to input a predetermined address as the desired boarding location.

Instead of inputting a specific address, or the like, the user terminal 12 may be configured to display a menu indicating that a current location is selected (an example of first location information), and accept input of the one selected by the user 10.

At the same time, the user 10 inputs a desired alighting time (an example of second time information) with the use of the user terminal 12. Instead of inputting a specific time, the user terminal 12 may be configured to accept input of a time with reference to a desired boarding time, for example, 30 minutes after getting in the vehicle 50.

The user 10 inputs a desired alighting location (an example of second location information) with the use of the user terminal 12 (step S3). Instead of inputting a specific address, or the like, the user terminal 12 may be configured to accept a current location (an example of second location information) or information to select the same location as the boarding location (an example of second location information) as an alighting location.

These input pieces of information are transmitted to the management server 100 by the user terminal 12. When the user 10 wants associated service, such as using a private room, the user terminal 12 may be caused to transmit that the user 10 wants the associated service, the number of persons that use the service, and the like, to the management server 100 at the same time.

The request acquisition unit 111 of the management server 100 receives information regarding a boarding time, a boarding location, an alighting time, and an alighting location that the user 10 wants. The vehicle arrangement unit 113 of the management server 100 executes a calculation process for determining whether there is any available vehicle 50 to be arranged for the user 10 among the plurality of vehicles 50 under management and selecting the vehicle 50 to be arranged (step S4).

Initially, the management server 100 extracts the vehicle 50 having at least one vacant seat from the desired boarding time to the desired alighting time by consulting the status information storage unit 105 for the operating statuses of the vehicles 50. When the user 10 wants associated service, such as using a private room, the management server 100 extracts the vehicle 50 that provides such service by consulting the status information storage unit 105.

The vehicle arrangement unit 113 of the management server 100 determines whether the extracted vehicle 50 goes to the desired location at the desired time. Specifically, the vehicle arrangement unit 113 makes a determination based on, for example, route information that incorporates the boarding location, boarding time, alighting time, and alighting location received from the user terminal 12 of another user 10 by consulting the route information in the status information storage unit 105.

For example, a user 10A wants to get in at point A (for example, the location of the place of work of the user 10A)

at 2:00 p.m. and gets off at point A' (for example, a business trip destination of the user 10A) at 3:00 p.m., and when a predetermined vehicle 50 has been already scheduled such that another user 10B gets off at point B at 1:30 p.m. as a schedule just before 2:00 p.m. and another user gets off at point C at 2:30 p.m. as a schedule just after 2:00 p.m., the management server 100 carries out a simulation as to whether the vehicle 50 that starts from point B at 1:30 p.m. is able to reach point A at 2:00 p.m. (or just before then). Similarly, the management server 100 carries out a simulation as to whether the vehicle 50 that starts from point A at 2:00 p.m. is able to reach point C at 2:30 p.m. As a result of these simulations, when the vehicle arrangement unit 113 determines that the vehicle 50 is able to move from point B to point A and from point A to point C on time, the vehicle arrangement unit 113 determines that the vehicle 50 is able to move to point A at 2:00 p.m. for the user 10A.

When there is no latest schedule of the predetermined vehicle 50, the vehicle arrangement unit 113 determines whether the vehicle 50 is able to move to point A at 2:00 p.m. based on the current location of the vehicle 50.

Similarly, as for the alighting time as well, the vehicle arrangement unit 113 determines whether the vehicle 50 is able to move to point A' at 3:00 p.m. based on the schedules of the other users 10 just before and just after 3:00 p.m.

When the vehicle arrangement unit 113 determines whether there is any vehicle 50 to be arranged for the user 10, the vehicle arrangement unit 113 may make a determination additionally based on another piece of information (for example, a congestion situation of a surrounding route, accident information, or the like).

The database 106 includes, as map data, data of places that obstruct entry or temporary stop of the vehicles 50, data of places where passage of the vehicles 50 is not preferable, such as places near hospitals or educational institutions, and data of places where smoking is prohibited based on ordinances, and the like. When a boarding location or an alighting location that the user 10 wants belongs to such places, the management server 100 transmits a message prompting the user 10 to specify a different location or a surrounding preferable boarding location or alighting location to the user terminal 12.

When there is a plurality of vehicles 50 that the user 10A is allowed to get in and get off as desired, precedence may be given among the vehicles 50 based on a predetermined criterion. For example, a vehicle 50 of which the travel distance is shorter takes precedence. In addition, a vehicle 50 having no tight schedule before and after a desired time takes precedence, and a vehicle having no schedule takes precedence.

As a result of such a calculation process, when the management server 100 is able to arrange the vehicle 50 as desired by the user 100A, the management server 100 provides information that the management server 100 is able to arrange the vehicle 50 as desired, cost, and the like, to the user 10A, and finally confirms the details of service scheduled to be provided. The user 100A makes final approval and determines the service with the use of the user terminal 12 (step S5).

As the management server 100 receives information indicating the final approval from the user terminal 12, the management server 100 transmits instruction information including the boarding location, boarding time, alighting location, and alighting time that the user 10A wants to the vehicle 50 to be arranged (step S6). The vehicle terminal 52 of the vehicle 50 receives the boarding location, the boarding time, the alighting location, and the alighting time from the management server 100. The instruction information received by the vehicle 50 is recorded on a recording terminal of the vehicle 50, and is incorporated into the route for the vehicle 50.

When there is no vehicle 50 as desired by the user 10A, the management server 100 is able to send back information that there is no vehicle 50 as desired to the user terminal 12 and transmit an alternative to provide (step S7).

For example, when the predetermined vehicle 50 is able to move to point A at 2:00 p.m. for the user 10A but the predetermined vehicle 50 is not allowed to move to point A' at 3:00 p.m. because of the existing schedule, the management server 100 may provide a first alternative that the user 10A gets off at 3:00 p.m. at point A'' that is a location closest to point A' within an area in which the vehicle 50 is reachable at 3:00 p.m., and, when the vehicle 50 is able to move to point A' at 2:45 p.m., may provide a second alternative that the user 10A gets off at point A' at 2:45 p.m.

The user 10A is allowed to determine whether to accept any one of the proposed alternatives and reply to the management server 100 (step S8).

A method of specifying a boarding time or an alighting time may be configured to be able to specify a time period of a predetermined range (for example, a time period of 15 minutes between 2:00 to 2:15 as a boarding time). With this configuration, it is possible to reduce the risk that the vehicle 50 is not able to reach a specified location at a specified time depending on a surrounding traffic situation. Alternatively, a method of specifying a boarding location or an alighting location may be configured to be able to specify a location of a predetermined range (for example, an area within a radius of 200 meters from point A).

The user 10A is allowed to make an abstract request to specify a location close to a current location as much as possible at a time as early as possible from a current time. In this case, the management server 100 is able to extract candidates for the vehicle 50 that is able to reach a location close to the user 10A as much as possible and candidates for the vehicle 50 that is able to reach near the user 10A as early as possible, and provide the user 10A with at least one candidate for a boarding location and at least one candidate for a boarding time while setting precedence with the use of a predetermined algorithm.

The user 10A determines whether to accept any one of the proposed schedules, such as alternatives, with the use of the user terminal 12 (step S8). When the user 10A accepts any one of the proposed schedules, the user 10A makes final approval and determines the service (step S8). As the management server 100 receives information indicating final approval from the user terminal 12, the management server 100 transmits the boarding location and time and alighting location and time of the user 10A to the vehicle 50 to be arranged (step S9). The vehicle terminal 52 of the vehicle 50 receives, from the management server 100, the identification information of the user 10A and instruction information including the boarding location, the boarding time, the alighting location, and the alighting time. The received information is recorded on the recording terminal of the vehicle 50, and is incorporated into the route of the vehicle 50. When the user 10A does not accept the proposed schedules, such as alternatives, the process ends (step S9).

The car navigation system 55 of the vehicle terminal 52 incorporates the boarding location, boarding time, alighting location, and alighting time, received from the management server 100, into the route as stopover places, and calculates a route to reach the specified boarding location or alighting location at the specified time from the last stopover place.

However, different from ordinary route calculation, the car navigation system 55 does not always calculate a route to reach a destination at the shortest distance or in the shortest time. For example, when the vehicle 50 loads the user 10B at point B at time t1 and loads the user 100A at point A at time t2, the vehicle 50 may reach point A too early if the vehicle 50 travels at the shortest distance.

In such a case, for example, the vehicle 50 travels along the shortest-distance route from point B to around point A, and then selects a route that is not the shortest in distance. Thus, the vehicle 50 is able to reach point A at specified time t2. Alternatively, the car navigation system 55 may search for a place at which the vehicle 50 is allowed to be on standby near point A, travel along a route of the shortest distance from point B to the standby place, then wait at the standby place, and then travel along a route of the shortest distance from the standby place to point A. The vehicle 50 may be controlled to move at a speed close to the upper limit of a legal speed up to near point A, and reach point A at specified time t2 after reaching near point A while calculating a current time and a distance to point A and dynamically calculating a moving speed or moving route of the vehicle 50. In this way, since the car navigation system 55 calculates a route by acquiring boarding location information as one of the stopover places together with a boarding time and acquiring alighting location information as one of the stopover places together with an alighting time, the car navigation system 55 has a function different from a car navigation system that calculates a route by acquiring only location information. When only location information is input to the car navigation system 55, the car navigation system 55 is able to calculate a shortest-distance route and a shortest-time route as in the case of usual.

After that, as the vehicle terminal 52 of the vehicle 50 reaches point A or sufficiently approaches point A at time t2 or several minutes before time t2, the vehicle terminal 52 provides the management server 100 with notification that the vehicle 50 has reached point A or the vehicle 50 is expected to reach point A in several minutes. The management server 100 provides the user 10A with notification that the vehicle 50 has reached point A. The user terminal 12 indicates the location of the vehicle 50 on a map based on information from the management server 100.

Figure 6:
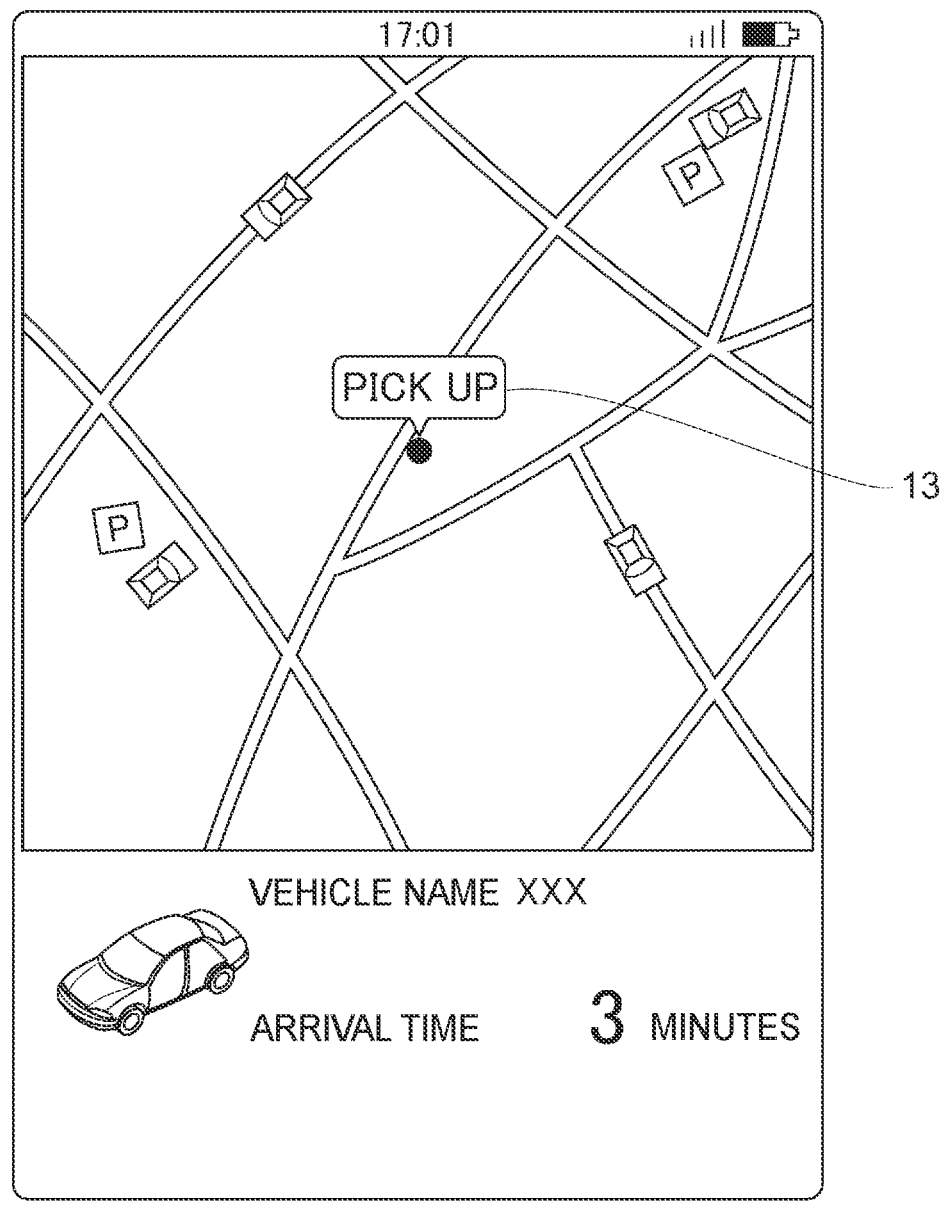
FIG. 6 is an example of a map that shows a stop location of the vehicle on a user terminal.

FIG. 6 is a schematic view that shows the map, the stop location of the vehicle 50, indicated by the balloon 13 with "PICK UP", and the appearance of the vehicle 50, on the touch panel display of the user terminal 12. This drawing shows display on the touch panel display of the user terminal 12 in the case of providing notification to the user terminal 12 at the time when the vehicle 50 reaches the stop location in three minutes.

As the user 10A finds the vehicle 50 stopping at point A, the user 10A provides a request to unlock the vehicle 50 to the management server 100 with the use of the user terminal 12. The management server 100 transmits an unlocking command to the vehicle terminal 52 in response to the request from the user terminal 12. Since the vehicle 50 is unlocked in accordance with the command, the user 10A is allowed to get into the vehicle 50. At this time, since air curtain is activated at the entrance of the vehicle 50 and a negative pressure is applied to the inside of the vehicle 50 by a smoke removal system in the vehicle 50, leakage of sidestream smoke, or the like, in the vehicle 50 to the outside of the vehicle is reduced.

As the vehicle 50 is unlocked, the user 10A gets into the vehicle 50, and brings the user terminal 12 close to the designated operation accepting unit 56. The user terminal 12 transmits the ID of the user 10A from the communication unit, such as short-distance wireless unit, to the operation accepting unit 56. The state setting unit 57 acquires and records the ID of the user 10A, received from the operation accepting unit 56, and transmits the ID to the management server 100 via the onboard communication device 61.

The management server 100 updates the vehicle status information in accordance with this notification such that the vehicle status information indicates that the user 10A is riding in the predetermined vehicle 50. After that, the vehicle 50 starts moving toward the next stopover place. The user 10A enjoys smoking during then. As the vehicle 50 reaches point A' that is the alighting location, the vehicles 50 stops. Since the user 10A gets sprayed air jet in the clean room, it is possible to remove toxic substances adherent to the clothing, and the like. At the time of getting off as well, air curtain is activated as in the case at the time of getting in, so sidestream smoke, or the like, in the vehicle is hard to leak to the outside. As in the case at the time of getting in, the user 10A brings the user terminal 12 close to the operation accepting unit 56. Thus, the state setting unit 57 acquires getting off of the user 10A, and provides notification to the management server 100. As the management server 100 receives this notification, the management server 100 similarly updates the vehicle status information such that the vehicle status information incorporates the fact that the user 10A has finished using the vehicle 50. The management server 100 may further update the database that contains service use information stored for each user 10, and transmit notification informing completion of use of the service to the user terminal 12 of the user 10A by e-mail, or the like.

As described above, with the system 1 according to the present embodiment, since it is possible to arrange the smoking vehicle 50 in response to a request from the user 10, it is not required to look for a smoking space. Since the vehicle 50 is able to move to a desired location of the user 10 or near the desired location, it is possible to reduce time and effort to move to a smoking space. Furthermore, the disclosure also allows a use method in which the user 10 gets into the vehicle 50 for a predetermined time and then gets off at the same location as the boarding location.

According to the present embodiment, since each user 10 transmits not only a desired boarding location and a desired boarding time but also a desired alighting location and a desired alighting time to the management server 100, the management server 100 is able to determine whether a predetermined one of the users 10 (for example, the user 10A) is able to get in and get off as desired based on boarding and alighting locations and times from another one of the users 10. Therefore, it is possible to respectively provide the smoking vehicles 50 to the plurality of users 10 so as to satisfy boarding and alighting locations and times.

For example, when the user 10 wants to reserve time to smoke for 30 minutes at the time of moving by vehicle to a place where it takes 15 minutes at the shortest, the user 10 is allowed to move to the destination by taking 30 minutes while smoking with the use of the system 1 according to the present embodiment. The user 10 is allowed to move to the destination while being relaxed by smoking or thinking for 30 minutes. Since the user 10 is allowed to allocate a time period determined in advance to smoking by specifying a boarding time and an alighting time, the user 10 is allowed to smoke by design.

However, as illustrated in the following alternative embodiments, the disclosure is not limited to the present embodiment.

First Alternative Embodiment

In the above-described embodiment, the management server 100 receives not only a boarding location and a boarding time but also an alighting location and an alighting time from each user 10, and determines a vehicle 50 to be arranged based on these boarding location, boarding time, alighting location, and alighting time.

However, there is a user 10 who wants to get into a vehicle 50 without specifying an alighting time, so it is possible to accept a vehicle dispatch request from part of the users 10 without specifying an alighting location or an alighting time for such users 10.

For example, the application may be configured to be able to accept only a boarding time and a boarding location without specifying an alighting time or an alighting location, and may be configured to accept an alighting request from a user 10 by providing the vehicles 50 with a button for accepting alighting in order to accept an alighting request from the user 10. Alternatively, the application may have such a function of accepting an alighting request.

With the above configuration, it is possible to respond also to a smoking request from a user 10 who does not want to determine an alighting time or an alighting location in advance.

Second Alternative Embodiment

In the above-described embodiment, each vehicle 50 dynamically determines a route based on boarding locations and alighting locations, accepted from a plurality of users 10. However, the route of each vehicle 50 may consist of a section in which the vehicle 50 moves along a predetermined route and does not allow a user 10 to get in or off and a section other than that section, in which the vehicle 50 allows a user 10 to get in or off.

For example, in an outdoor concert venue where people can see from the inside of a vehicle 50, in order to see a concert while smoking inside the vehicle 50, the route of the vehicle 50 may consist of a section in which the vehicle 50 moves along a predetermined route where a user 10 is not allowed to get in or off in the concert venue where outdoor smoking is prohibited and a section outside of the concert venue, where the user 10 is allowed to get in or off.

With this configuration, since it is possible to completely stop the leakage of sidestream smoke, or the like, from the vehicle 50 to the outside by not allowing a user 10 to get in or off in some section, it is possible to allow people to smoke inside a vehicle 50 even in a place or facility where outdoor smoking is not allowed.

Other than the outdoor concert as described above, in a sightseeing tour for going around sightseeing areas where smoking on streets is prohibited, a section in which a vehicle 50 moves along a predetermined route where a user 10 is not allowed to get in or off is provided in part of a route of the vehicle 50. Thus, the user 10 is allowed to go around sightseeing areas, and the like, while smoking although the sightseeing areas are areas where smoking on streets is prohibited. As in the case of the above-described embodiment, in an area outside of such a section, it is possible to accept a request for a boarding location and an alighting location from a user 10.

When the disclosure is applied to a tour that goes around an event of which a holding time is set in advance, such as an outdoor concert, the system 1 may be configured to, while the event is held, accept neither boarding and alighting locations not boarding and alighting times.

For example, when the route of the vehicle 50 partially includes seeing an outdoor concert that is scheduled to be held at point A from 18:30 to 21:30, the system 1 may be configured to cause the management server 100 to determine whether a desired boarding time, boarding location, alighting time, and alighting location of each user 10 are satisfied while meeting the requirements that the vehicle 50 reaches point A, which is one of stopover places, at 18:30 and leaves point A at 21:30. As the number of users 10 increases, the route along which the vehicle 50 runs before 18:30 or after 21:30 changes; however, the route that the vehicle 50 stops at point A from 18:30 to 21:30 does not change depending on the users 10.

In this way, the disclosure is applicable with restrictions on part of boarding and alighting locations and times.

The plurality of users 10 does not need to gather at a gathering place, gathering time, dismissing place, and dismissing time, set in advance, as in the case of an existing sightseeing bus. Each of the users 10 is allowed to get in or off at desired location and time, and start smoking. Therefore, it is possible to provide the plurality of users 10 with smoking environments as desired by users 10.

Each vehicle 50 may be caused to run along a predetermined route, and the user 10 may be caused to select a boarding location, and the like, along the route.

The above-described embodiments are intended to easily understand the disclosure, and are not intended to interpret the disclosure in a limited way. Elements of the embodiments, and the arrangement, materials, conditions, shapes, sizes, and the like, of the elements are not limited to the illustrated ones, and may be modified as needed. Components described in the different embodiments may be partially replaced or may be combined.

In the specification, a unit or procedure does not merely refer to a physical component, and includes a case where a process that the unit, or the like, executes is implemented by software. A process that a single unit, or the like, or a device executes may be implemented by two or more physical components or devices. Processes that two or more units, or the like, or devices execute may be implemented by a single physical component or device.

What is claimed is:

1. A server for providing a smoking vehicle to a user who wants to smoke, the server comprising a communication device configured to:
   receive first time information indicating a boarding time and first location information indicating a boarding location from an information terminal of the user,
   receive location information from a plurality of vehicles, and
   receive second time information indicating an alighting time and second location information indicating an alighting location from the information terminal of the user,
   wherein the server further comprises a processor configured to select the smoking vehicle from among the plurality of vehicles based on the received first time information, the received second time information, the received first location information, the received second location information, and the location information received from each of the plurality of vehicles, and
   wherein the communication device is configured to transmit the first time information the second time information, the first location information to the smoking vehicle, and the second location information to the selected vehicle.

2. The server according to claim 1, wherein the second location information is the same as the first location information.

3. The server according to claim 1, wherein:
the communication device is configured to receive, from the smoking vehicle, route information indicating a stopover place where the smoking vehicle is scheduled to move and a time at which the smoking vehicle reaches the stopover place; and
the processor is configured to determine whether the smoking vehicle is able to move to the location indicated by the first location information at the time indicated by the first time information based on the route information.

4. The server according to claim 1, wherein the first location information is information that indicates a current location of the user.

5. A smoking vehicle comprising:
a communication device configured to
transmit location information of the vehicle to a server, and
receive first time information indicating a boarding time and first location information indicating a boarding location from the server that receives the first time information and the first location information from an information terminal of a user who wants to smoke; and
a processor configured to calculate a route to reach the location indicated by the first location information at the time indicated by the first time information.

6. The vehicle according to claim 5, wherein:
the communication device is configured to receive second time information indicating an alighting time and second location information indicating an alighting location from the server that receives the second time information and the second location information from the information terminal of the user; and
the processor is configured to calculate a route to reach the location indicated by the second location information at the time indicated by the second time information.

7. The vehicle according to claim 6, wherein the processor is configured to, when the processor has received third time information indicating a boarding time and third location information indicating a boarding location from the server that receives the third time information and the third location information from an information terminal of a second user who wants to smoke, calculate a route to reach the location indicated by the first location information at the time indicated by the first time information, to reach the location indicated by the second location information at the time indicated by the second time information, and to reach the location indicated by the third location information at the time indicated by the third time information.

8. The vehicle according to claim 5, further comprising an output device configured to display the route.

9. A system comprising:
a plurality of smoking vehicles to be provided to a user who wants to smoke; and
a server configured to carry out communication with the plurality of vehicles, the server being configured to
receive first time information indicating a boarding time and first location information indicating a boarding location from an information terminal of the user,
receive location information from each of the plurality of vehicles,
select a vehicle from among the plurality of vehicles based on the received first time information, the received first location information, and the location information received from each of the plurality of vehicles, and
transmit the first time information and the first location information to the vehicle selected from among the plurality of vehicles.

* * * * *

UNITED STATES PATENT AND TRADEMARK OFFICE
CERTIFICATE OF CORRECTION

PATENT NO. : 10,685,565 B2
APPLICATION NO. : 16/266204
DATED : June 16, 2020
INVENTOR(S) : Mitsugu Makita, Daigo Fujii and Naoki Yamamuro Page 1 of 1

It is certified that error appears in the above-identified patent and that said Letters Patent is hereby corrected as shown below:

On the Title Page

Item (72), inventor 1, city, delete "Nagoya" and insert --Nagoya-shi Aichi-ken--, therefor.

Item (72), inventor 2, city, delete "Tsushima" and insert --Tsushima-shi Aichi-ken--, therefor.

Item (72), inventor 3, city, delete "Nagoya" and insert --Nagoya-shi Aichi-ken--, therefor.

In the Specification

In Column 11, Line(s) 53, delete "100A" and insert --10A--, therefor.

In Column 11, Line(s) 57, delete "100A" and insert --10A--, therefor.

In Column 13, Line(s) 5, delete "100A" and insert --10A--, therefor.

In the Claims

In Column 16, Line(s) 64, Claim 1, after "information", insert --,--.

Signed and Sealed this
First Day of September, 2020

Andrei Iancu
*Director of the United States Patent and Trademark Office*